US012762344B2

(12) United States Patent
Idrisov

(10) Patent No.: US 12,762,344 B2
(45) Date of Patent: Oct. 13, 2026

(54) SPLITTING REGULAR EXPRESSIONS BETWEEN NON-DETERMINISTIC FINITE AUTOMATON AND DETERMINISTIC FINITE AUTOMATON

(71) Applicant: Microsoft Technology Licensing, LLC, Redmond, WA (US)

(72) Inventor: Renat Idrisov, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 18/661,796

(22) Filed: May 13, 2024

(65) Prior Publication Data

US 2025/0348678 A1 Nov. 13, 2025

(51) Int. Cl.
*G06F 40/289* (2020.01)
*G06F 40/284* (2020.01)

(52) U.S. Cl.
CPC .......... *G06F 40/289* (2020.01); *G06F 40/284* (2020.01)

(58) Field of Classification Search
CPC ....... G06F 40/289; G06F 40/284; G06F 8/427
See application file for complete search history.

(56) References Cited

U.S. PATENT DOCUMENTS 8,051,085 B1 * 11/2011 Srinivasan .......... H04L 63/0245 707/758
9,858,051 B2 1/2018 Goyal
10,535,010 B2 * 1/2020 Mistry .................. G06F 16/285
10,635,419 B2 4/2020 Yang
11,010,167 B2 5/2021 Billa
11,636,115 B2 4/2023 Billa
11,636,154 B2 4/2023 Goyal
2006/0085389 A1 * 4/2006 Flanagan .......... G06F 16/90344 707/999.005
2007/0130140 A1 6/2007 Cytron
2012/0221497 A1 8/2012 Goyal et al.
2014/0149439 A1 5/2014 Ruehle
(Continued)

OTHER PUBLICATIONS

International Search Report and Written Opinion received for PCT Application No. PCT/US2025/016999, Apr. 16, 2025, 17 pages.
(Continued)

*Primary Examiner* — Abul K Azad
(74) *Attorney, Agent, or Firm* — Ranjeev Singh; Singh Law, PLLC

(57) ABSTRACT

Systems, methods, and computer-readable medium for splitting regular expressions between non-deterministic finite automaton and deterministic finite automaton are provided. A method includes parsing a set of regular expression patterns to generate an output. The method further includes processing the output to determine whether any of the set of regular expression patterns meets a specified criteria including whether a regular expression pattern is a single path regular expression. The method further includes using a first splitting process, splitting any of the set of regular expression patterns that meet the specified criteria into a first set of tokens. The method further includes using a second splitting process, different from the first splitting process, splitting any of the set of regular expression patterns that fail to meet the specified criteria into a second set of tokens.

20 Claims, 10 Drawing Sheets

(56) References Cited

U.S. PATENT DOCUMENTS

| | | | | |
|---|---|---|---|---|
| 2014/0215090 | A1* | 7/2014 | Ruehle | H04L 45/306 709/238 |
| 2016/0028766 | A1* | 1/2016 | Valgenti | H04L 63/1416 726/23 |
| 2016/0253378 | A1* | 9/2016 | Marom | G06F 16/245 707/755 |
| 2023/0342030 | A1 | 10/2023 | Kumawat | |
| 2023/0342068 | A1 | 10/2023 | Kumawat | |

OTHER PUBLICATIONS

"The Fungible DPU: A New Category of Microprocessor for the Data-Centric Era," Hot Chips, 2020, pp. 1-25.

* cited by examiner

100

300

400

500

600

800

SPLITTING REGULAR EXPRESSIONS BETWEEN NON-DETERMINISTIC FINITE AUTOMATON AND DETERMINISTIC FINITE AUTOMATON

BACKGROUND

Regular expressions are used for matching input strings with patterns, each of which can be a word, a phrase, or any set of characters, including symbols. A regular expression can also include metadata and characters that provide rules for searching an input string for a match to a regular expression. Regular expression compilers can be used to generate a binary output that encodes the rules for processing input strings in terms of finite state machine graphs. The graphs and related binaries output by the regular expression compiler can be processed by regular expression engines. The regular expression engines for processing regular expressions can include both deterministic finite automatons (DFAs) and non-deterministic finite automatons (NFAs). While DFAs are more suited for processing single path regular expressions, the NFAs can be used to process instructions that can handle forward matching, reverse matching, looping, or other types of paths.

The flexibility associated with NFAs, however, comes at the cost of less predictability in terms of performance. On the other hand, DFAs are more predictable in terms of performance since each step is consuming only one symbol/character of the payload and there is no need to track states, as would be the case with the NFAs. While DFAs offer the potential of faster search for patterns they have drawbacks, as well. The size of DFA graphs can grow very large quickly even for simple straight-forward patterns. Accordingly, there is a need for improvements to compilers that are used to generate DFA graphs and NFA graphs for a set of regular expression patterns.

SUMMARY

In one example, the present disclosure relates to a computer-implemented method including parsing a set of regular expression patterns to generate an output. The method further includes processing the output to determine whether any of the set of regular expression patterns meets a specified criteria, including whether a regular expression pattern is a single path regular expression.

The method further includes using a first splitting process, splitting any of the set of regular expression patterns that meet the specified criteria into a first set of tokens. The method further includes using a second splitting process, different from the first splitting process, splitting any of the set of regular expression patterns that fail to meet the specified criteria into a second set of tokens.

In another example, the present disclosure relates to a computer-implemented method including generating an abstract syntax tree by parsing a set of regular expression patterns. The method further includes processing the abstract syntax tree to determine whether any of the set of regular expression patterns meets a specified criteria including: (1) whether a regular expression pattern is a single path regular expression, and (2) whether the regular expression pattern excludes assertions.

The method further includes using a first splitting process, splitting any of the set of regular expression patterns that meet the specified criteria into a first set of tokens. The method further includes using a second splitting process, different from the first splitting process, splitting any of the set of regular expression patterns that fail to meet the specified criteria into a second set of tokens.

In yet another example, the present disclosure relates to a non-transitory computer-readable medium comprising code corresponding to a method. The method includes parsing a set of regular expression patterns to generate an output. The method further includes processing the output to determine whether any of the set of regular expression patterns meets a specified criteria, including whether a regular expression pattern is a single path regular expression.

The method further includes using a first splitting process, splitting any of the set of regular expression patterns that meet the specified criteria into a first set of tokens. The method further includes using a second splitting process, different from the first splitting process, splitting any of the set of regular expression patterns that fail to meet the specified criteria into a second set of tokens.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
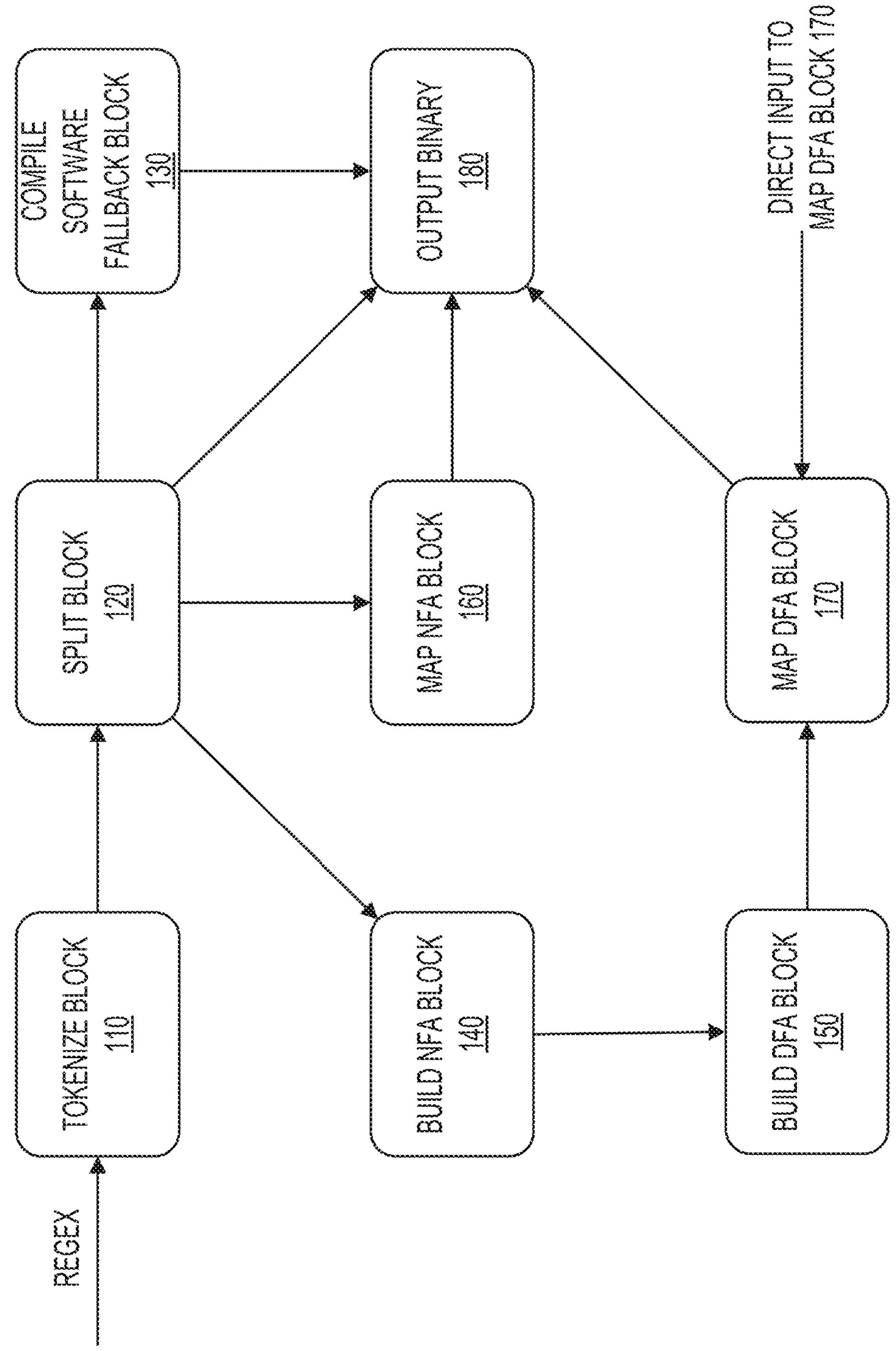
FIG. 1 is a block diagram of a regular expression (regex) compiler in accordance with one example.

Examples disclosed in the present disclosure relate to systems, methods, and computer-readable medium for splitting regular expressions between non-deterministic finite automaton and deterministic finite automaton. As noted earlier, regular expressions are used for matching input strings with patterns, each of which can be a word, a phrase, or any set of characters, including symbols. A regular expression can also include metadata and characters that provide rules for searching an input string for a match to a regular expression. Regular expression compilers can be used to generate a binary output that encodes the rules for processing input strings in terms of finite state machine graphs. The graphs and related binaries output by the regular expression compiler can be processed by regular expression engines. The regular expression engines for processing regular expressions can include both deterministic finite automatons (DFAs) and non-deterministic finite automatons (NFAs). While DFAs are more suitable for processing single path regular expressions, the NFAs can be used to process instructions that can handle forward matching, reverse matching, looping, or other types of paths.

The flexibility associated with NFAs, however, comes at the cost of less predictability in terms of performance. On the other hand, DFAs are more predictable in terms of performance since each step is consuming only one symbol/character of the payload and there is no need to track states as would be the case with the NFAs. While DFAs offer the potential of faster search for patterns they have drawbacks, as well. The size of DFA graphs can grow very large quickly even for simple straight-forward patterns. Accordingly, there is a need for improvements to compilers that are used to generate DFA graphs and NFA graphs for a set of regular expression patterns.

The input strings being searched can include strings related to networking traffic, intrusion detection (or other security-related data), storage data, or other types of data and/or instructions. As an example, networking traffic can be searched for input strings that may help a firewall deny or permit actions. Similarly, storage data can be searched for input strings to detect any malicious code or data. Hardware accelerators can be used to perform such specialized tasks, which are offloaded by the central processing units (CPUs) or the graphics processing units (GPUs). The specialized tasks can relate to the searching for input strings in the context of any of networking, storage, security, or virtualization aspects. One class of hardware accelerators for processing regular expressions can include deterministic finite automatons (DFAs) and non-deterministic finite automatons (NFAs).

A hardware accelerator including such DFAs and NFAs may be implemented using any of Application Specific Integrated Circuits (ASICs), Field Programmable Gate Arrays (FPGAs), Erasable and/or Complex programmable logic devices (PLDs), Programmable Array Logic (PAL) devices, or Generic Array Logic (GAL) devices. Desired regular expression processing functionality can be implemented to support any service that can be offered via a combination of computing, networking, and storage resources, such as via a data center or other infrastructure for delivering a service.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

As used in the examples described in the present disclosure, a regular expression is a token. A token can have several different meanings, as described in Table 1 below.

TABLE 1

| |
|---|
| a. A character to be matched. (e.g., "a", "b") |
| b. Assertions about the current position in the payload. An assertion can be a special constraint (e.g., the beginning of a word or the beginning of a line). An assertion can also be a token in which case the parenthesis are supplemented with a matching direction and optional negation of the match. |
| c. Repetition of a token with a lower_bound >= 0 and an upper_bound >= lower_bound. Repetition can be lazy, eager, or possessive. The upper bound can be set to a special value which represents infinity. (e.g., "a"{0, 8}, "a"{1, inf}, "a"{5, 5}). |
| d. Sequence of tokens to be matched. (e.g., "a" "b" "c"). |
| e. Alternation of Tokens (match A or B). (e.g., ("a" or "b" or "c")). |
| f. Capture group. Capture group is a token in which a matched payload string is stored for further matching once the token has been matched. (e.g., Capture is a token in parenthesis). |
| g. Backreference is a reference to a capture group. (e.g., ("a" or "b")\\1). |

In the split examples described herein, the token is viewed as on the top level of the regular expression unless it is enclosed in parenthesis. For example, the token "a" "b" ("c" or "d"), "a" and "b" are viewed as on the top level. Moreover, the minimal length of a token is the minimal length of a string it can match. For example, the token "a" or ("a" "b") has a minimal length of 1 and the token "a" {0, 11} has minimal length of 0. Moreover, a single path regular expression is an expression which can accept only one distinct string and has no assertions for the surrounding text. Finally, a cross-reference between two parts of a regular expression exists if one part defines a capture group and another part has a backreference to it. As noted in table 1, a backreference is a reference to a capture group.

FIG. 1 is a block diagram of a regular expression (regex) compiler 100 in accordance with one example. Regex compiler 100 includes code to generate bytecodes (or another form of binary for execution by a hardware accelerator). Input for the regex compiler 100 includes regular expressions to be processed and combined into a single artifact. Regex compiler 100 includes several logical blocks that are further described with respect to FIG. 1. Output from the regex compiler 100 includes output binary 180, which is not a logical block, but instead is indicative of the common artifact produced as a combination of the DFA, NFA, and the software data. The regular expressions received by regex compiler 100 are first parsed using the tokenize block 110. Tokenize block 110 processes the received regular expressions and outputs an abstract syntax tree (AST), which is provided to split block 120. As a result of the processing by split block 120, the DFA part of the abstract syntax tree is provided to build NFA block 140 and the NFA part of the abstract syntax tree is provided to map NFA block 160. Moreover, any software part of the AST is provided to compile software (SW) fallback block 130. In addition, any metadata related to the regular expression is output as part of the output binary 180. Additional details for the split block 120 are provided later as part of the description associated with FIG. 2.

With continued reference to FIG. 1, build NFA block 140 receives the DFA part of the AST from split block 120 and outputs a graph to build DFA block 150. Build DFA block 150 provides output to map DFA block 170, which also receives direct input. Map DFA block 170 generates DFA bytecode, which is stored as part of output binary 180. As a result of the processing by the map NFA block 160, NFA bytecode is emitted, which is stored as part of output binary 180. Since NFA can be seen as a program with fewer jumps compared to DFA, it can be split between faster internal buffer memory and external memory based on N top instructions, where N depends on the amount of internal buffer memory available at the time of the mapping. As part of the map DFA block 170, the DFA graph is converted to DFA binary. As an example, this process can include mapping nodes in the DFA to different memories based on whether a memory is a faster cache or an external memory (e.g., a DRAM). Although FIG. 1 shows a certain number of logical blocks as part of regex compiler 100, it may include additional or fewer logical blocks that are arranged differently.

Figure 2:
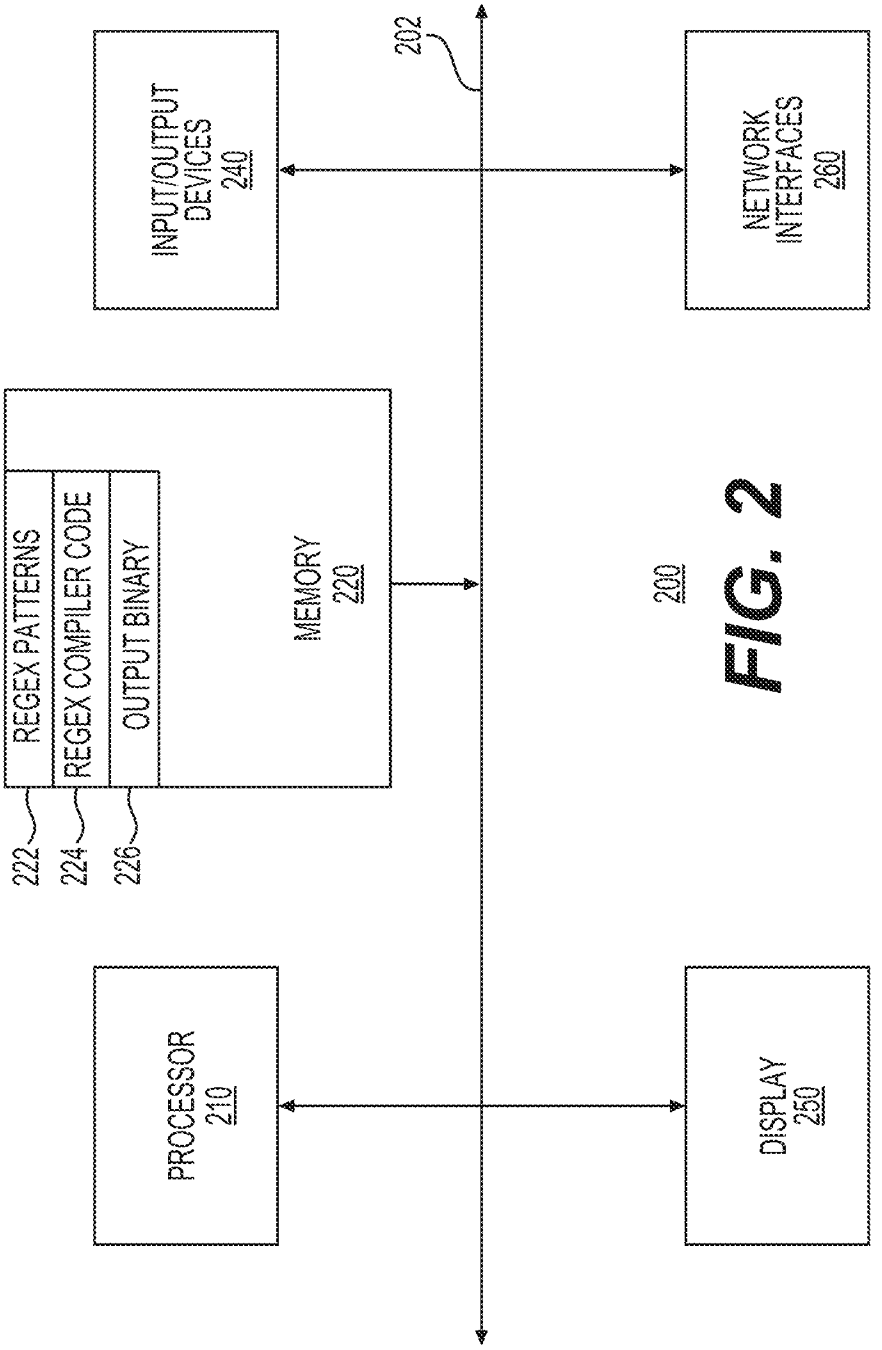
FIG. 2 shows example split workflow for use with the regex compiler of FIG. 1.

FIG. 2 is a block diagram of a system 200 for splitting regular expressions between non-deterministic finite automaton (NFA) and deterministic finite automaton (DFA) in accordance with one example. System 200 includes a processor 210, a memory 220, input/output devices 240, display 250, and network interfaces 260 interconnected via bus system 202. Memory 220 includes regex patterns 222, regex compiler code 224, and output binary 226. Regex compiler code 224 may include code corresponding to the various logical blocks of regex compiler 100 of FIG. 1. Output binary 226 may include the output generated by the execution of the regex compiler code 224 by processor 210 (e.g., output binary 180 of FIG. 1). Although FIG. 2 shows a certain number of components of system 200 arranged in a certain way, additional or fewer components arranged differently may also be used. In addition, although memory 220 shows certain blocks of code, the functionality provided by this code may be combined or distributed. In addition, the various blocks of code may be stored in non-transitory computer-readable media, such as non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. In addition, as described herein the term code is not limited to "code" expressed in a particular encoding or expression via a particular syntax. As an example, code may include graphs or other forms of encodings.

Figure 3:
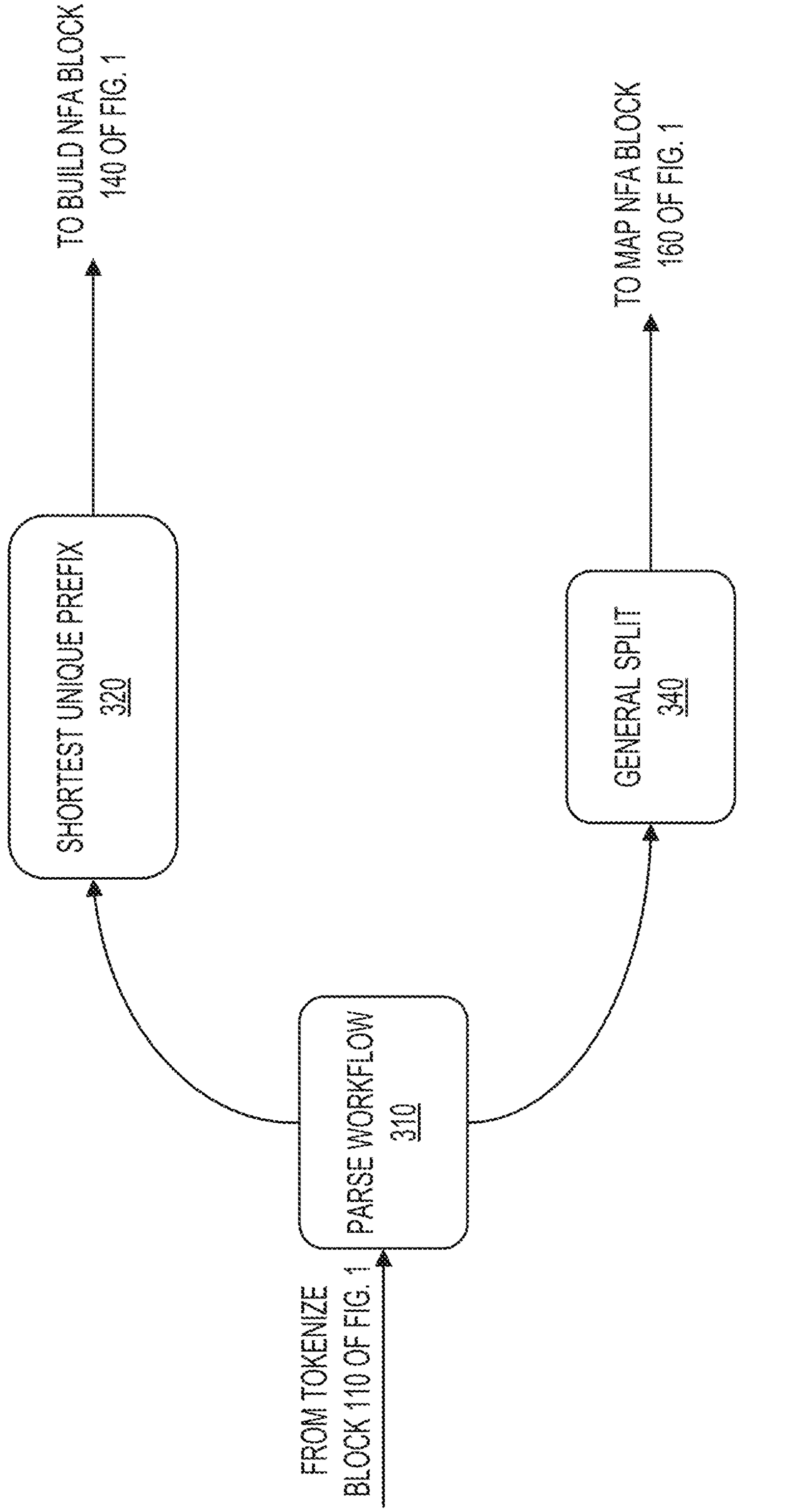
FIG. 3 is a block diagram of a system for splitting regular expressions between non-deterministic finite automaton and deterministic finite automaton in accordance with one example.

FIG. 3 shows example split workflow 300 for use with the regex compiler 100 of FIG. 1. In this example, split block 120 of regex compiler 100 of FIG. 1 is configured to perform the split workflow 300 shown in FIG. 3. The parse workflow stage 310 relates to processing the input from tokenize block 110 of FIG. 1. With continued reference to FIG. 3, in this example, as part of the parse workflow stage 310, split block 120 of FIG. 1 separates the regular expressions into three tokens: Pre-Filter, Forward, and Reverse. As part of these examples, the Forward and/or Reverse tokens could be empty but the Pre-Filter token cannot be empty. Moreover, both Forward and Reverse tokens could start from either the left side of the Pre-Filter token or from the right side of the Pre-Filter token. In this example, for each regular expression pattern there is no more than one Forward token and one Reverse token. A non-finite deterministic automaton (NFA) can traverse the payload in both directions; thus, it is useful for the situations when the middle of a pattern is used as a Pre-Filter. In this case the NFA could traverse the payload back to find the beginning of a match and in some cases also confirm that there is a match.

Thus, as part of the parse workflow stage 310 the regular expression is processed to determine whether the regular expression meets a specified criteria. In this example, the specified criteria includes two aspects: (1) whether the regular expression is a single path regular expression and (2) whether the regular expression includes any assertions. The single path criterion is met as long as the path includes one or more arcs in a sequence and the path is not looping, is not returning back to previous state, and is not joining another path. As explained earlier, an assertion can be a special constraint (e.g., the beginning of a word or the beginning of a line). An assertion can also be a token, in which case the parenthesis are supplemented with a matching direction and optional negation of the match. As an example, an assertion for the NFA can consist of two statements about the payload characters that could be about different characters or the same one. These statements can be combined with the logical operator "AND," and the whole assertion could be negated on top of that. If both aspects of the specified criteria are met, then the splitting is performed as part of the shortest unique prefix workflow stage 320. On the other hand, if the specified criteria (e.g., the two aforementioned aspects) is not met, the splitting is performed as part of the general split workflow stage 340.

With continued reference to FIG. 3, as part of the shortest unique prefix workflow stage 320, as part of getting the prefix tree built, in this example, the prefix must satisfy the following criteria: (1) the prefix must be unique against the tree built so far, and (2) the minimal prefix length must be less than 2 (the minimal length could be tuned but it cannot be less than 2 because it is limited by the DFA capabilities). In cases where the remaining suffix length is less than 2 then the suffix is considered empty, and the prefix is viewed as being equal to the regular expression being processed. The prefix obtained via this criteria is the Pre-Filter token. The remainder of the regular expression pattern is sent for Forward NFA token processing, which starts from the right. The Backward NFA token is empty in such a case.

Figure 4:
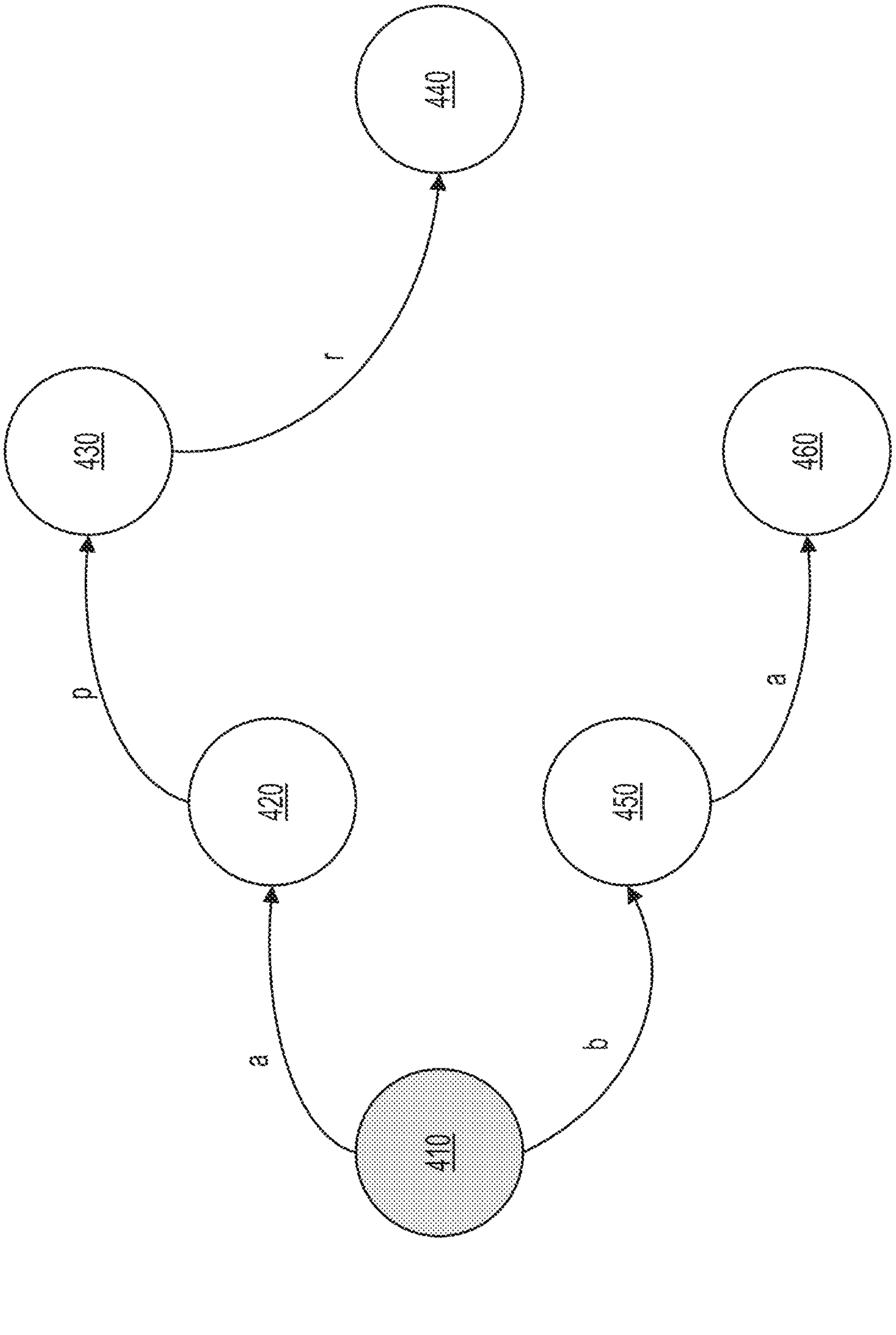
FIG. 4 shows a split example for a unique prefix tree.

FIG. 4 shows a split example for a unique prefix tree 400. The unique prefix tree 400 corresponds to patterns "apple," banana," and "apricot." In addition, in this example the minimal prefix length is set to 2. The unique prefix tree 400 includes a node 410 corresponding to the root state (may also be referred to as an activated state). The unique prefix tree 400 further includes nodes 420, 430, 440, 450, and 460. Assuming the pattern "apple" is processed first, one of the prefix-filter "ap" is created since it meets the criteria detailed earlier with respect to FIG. 3. Even though the prefix-filter "ap" is not unique for the complete set of the patterns, it was unique for the state of the prefix tree when (during processing the pattern "apple") it was created. The resulting list of prefixes are "ap", "ba", and "apr". In this example, the resulting list of the Forward NFAs (nodes 430, 440, and 450) will match the following suffixes: "ple", "nana", and "icot".

Figure 5:
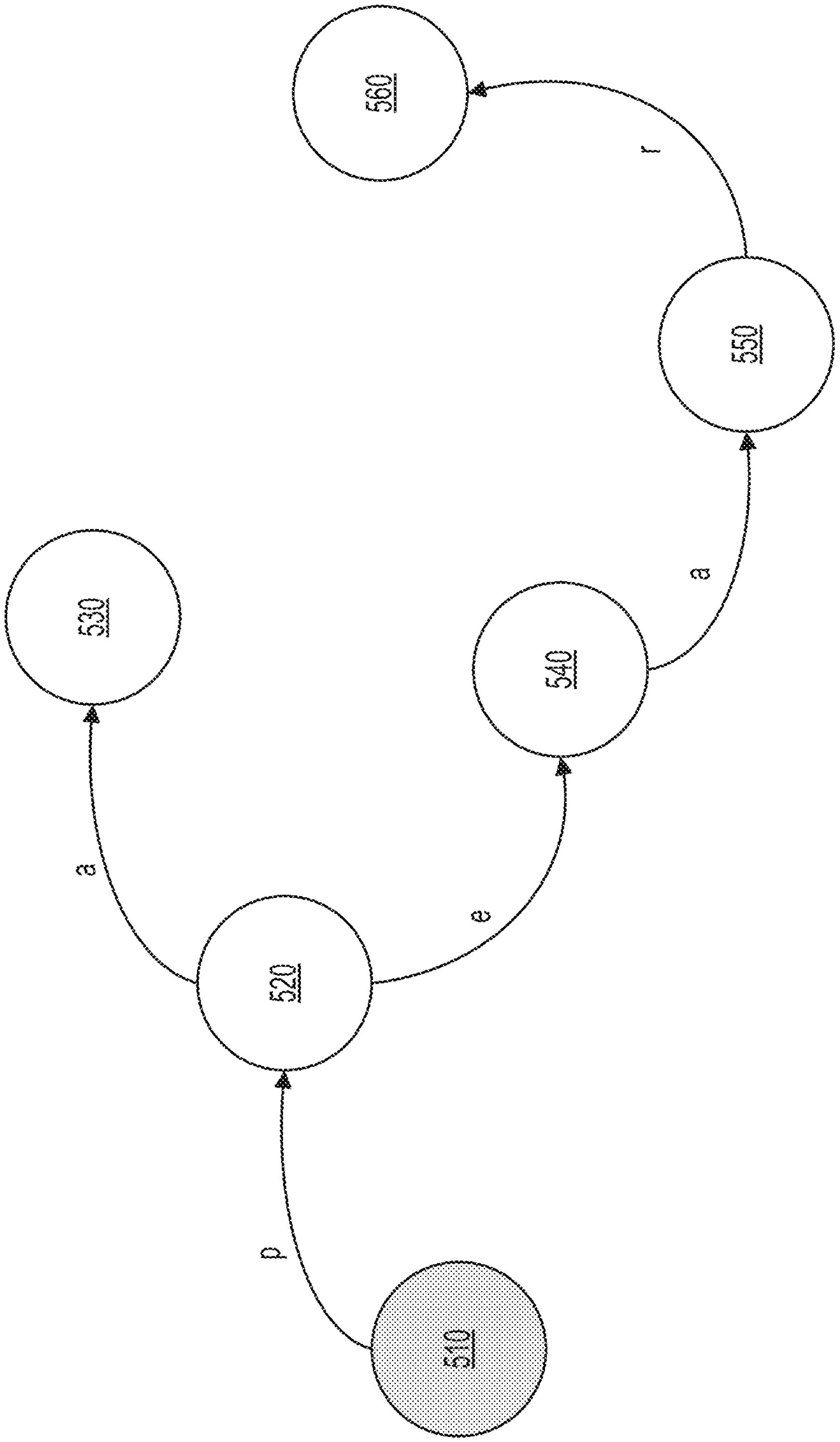
FIG. 5 shows another split example for a unique prefix tree.

FIG. 5 shows another split example for a unique prefix tree 500. The unique prefix tree 500 corresponds to patterns "papaya," peach," and "pear." In this example the minimal prefix length is set to 2. Similar to the unique prefix tree 400 of FIG. 4, the unique prefix tree 500 includes a node 510 corresponding to the root state (may also be referred to as an activated state). The unique prefix tree 500 further includes nodes 520, 530, 540, 550, and 560. When the pattern "pear" is processed, one of the prefix-filter "pe" is created since it meets the criteria detailed earlier with respect to FIG. 3. Even though the prefix-filter "pe" is not unique for the complete set of the patterns, it was unique for the state of the prefix tree when (during processing the pattern "pear") it was created. The resulting list of prefixes are "pa", "pe", and "pear". Notably, in this split example, the pattern "pear" is completely within the unique prefix tree because the remaining suffix length, after removing the unique prefix "pea", is less than the minimal length of 2. In this example, the resulting list of the Forward NFAs (nodes 530 and 550) will match the following suffixes: "paya" and "ach". Since the pattern "pear" was matched (match at node 560) within the DFA completely, there will be no remaining NFA part.

Figure 6:
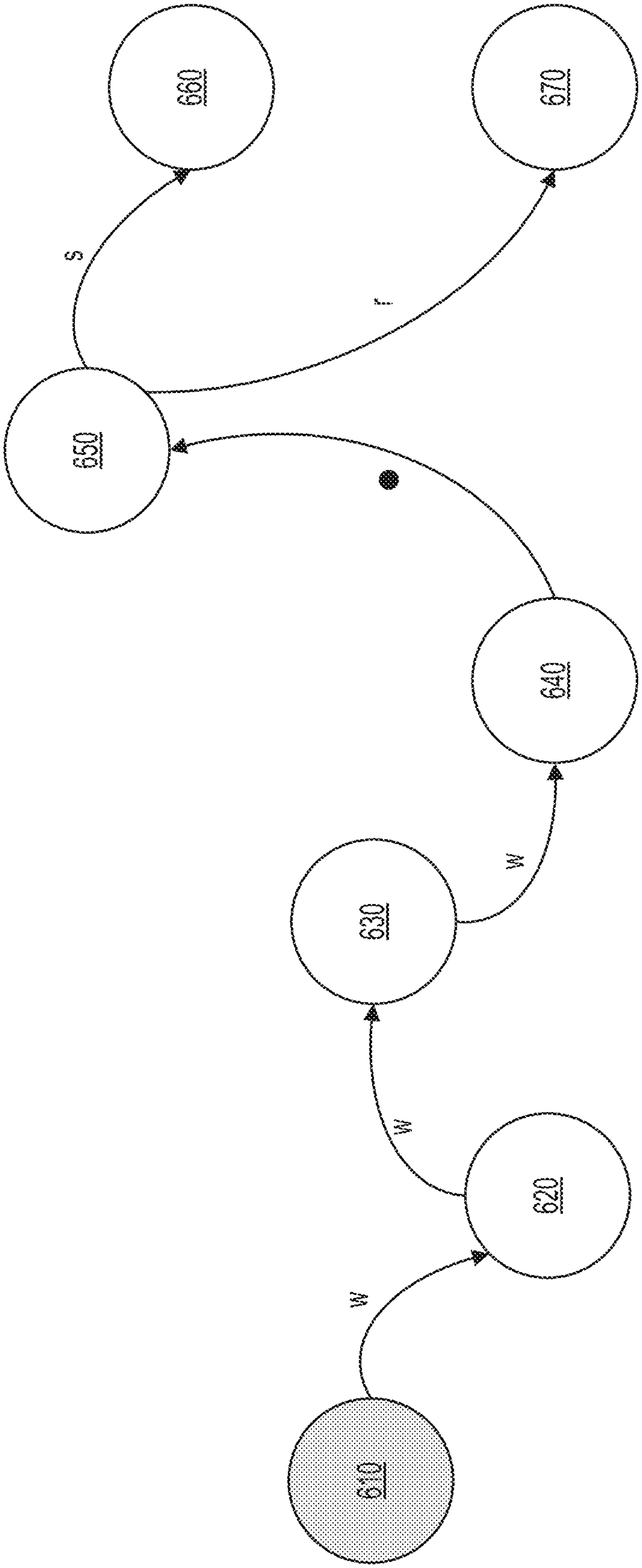
FIG. 6 shows a yet another split example for a unique prefix tree.

FIG. 6 shows a yet another split example a unique prefix tree 600. The unique prefix tree 600 corresponds to the following strings: www.nasa.gov, "www.stanford.edu", and "www.fungible.com". In this example the minimal prefix length is set to 4. Similar to the unique prefix tree 400 of FIG. 4 and unique prefix tree 500 of FIG. 5, the unique prefix tree 600 includes a node 610 corresponding to the root state (may also be referred to as an activated state). The unique prefix tree 600 further includes nodes 620, 630, 640, 650, 660, and 670. When the pattern "www" is processed, one of the prefix-filter "www" is created since it meets the criteria detailed earlier with respect to FIG. 3. Even though the prefix-filter "www" is not unique for the complete set of the patterns, it was unique for the state of the prefix tree when (during processing the pattern "www.nasa.gov") it was created. The resulting list of prefixes are "www", "www.s", and "www.f". In this example, the resulting list of the Forward NFAs (nodes 650, 660, and 670) will match the following suffixes: "nasa.gov", "tanford.edu", and "ungible-.com". In order to avoid filtering with frequently occurring strings like "www", a list of such prefixes can be included in a list of prefixes that are to be excluded. Such strings (e.g., "www") can only be considered a prefix if the whole string (e.g., "www.nasa.gov") is taken as a Pre-Filter token.

Turning now to the general split workflow stage 340 of the split workflow 300 of FIG. 3, the purpose of the general split is to find a token on the top level of a regular expression, starting from which, the set of acceptable strings is minimal. The general split algorithm has two parameters: the minimal prefix length and the maximal prefix length. Table 2 below shows the processing performed as part of the general split workflow stage 340 of FIG. 3.

TABLE 2

| |
|---|
| 1. Starting from each top-level token of the regular expression, calculate a size of the set of acceptable strings limited by the value of the Minimal Prefix Length. |
| 2. Exclude any positions from splitting that has a cross-reference between two portions of the regular expression. (For example, the regular expression "(abc)\1" cannot be split at "\1" because in this case the left part is referencing the right.). In this example, the backreference is to a capture group. |
| 3. While keeping the size of the set of acceptable strings constant, increase the lengths of the strings, formed for each position with minimal size of the set of acceptable strings. |
| 4. From among the resulting sets of acceptable strings, select the first one which has the maximal length. |

Figure 7:
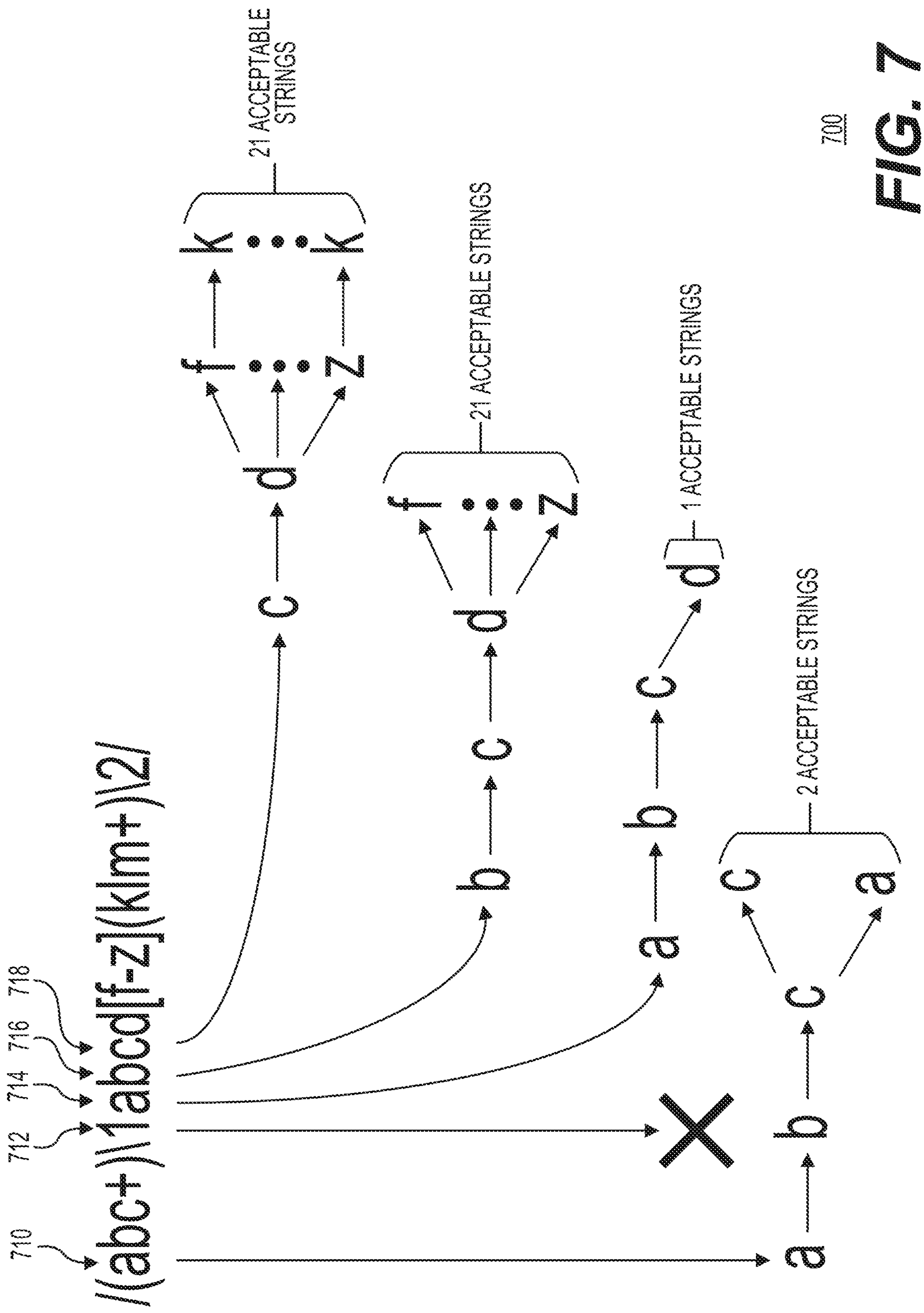
FIG. 7 shows a general split example.

FIG. 7 shows an example general split 700 for a regular expression pattern. General split 700 corresponds to the regular expression pattern: "/(abc+)\1abcd[f−z](klm+) \2/". Applying the process shown in Table 2 as part of the general split workflow stage 340 of FIG. 3 results in a DFA part "abcd/" which corresponds to the Pre-Filter token described earlier with respect to FIG. 3. In addition, the NFA Left Backward token includes "/(c+ba)\1/". Finally, the NFA right forward token includes "/[f−z](klm+)\2/". In this example, the number of paths shown in FIG. 7 corresponds to the number of different acceptable strings for the regular expression: "/(abc+)\1abcd[f−z](klm+)\2/". Thus, in this example, starting with position 710 corresponding to the character "a", there are two acceptable strings. The position 712 corresponding to "1" is excluded as an unacceptable path because of the backreference, which cannot be processed without processing the string "abc+" preceding "\". Starting with position 714 corresponding to the character "a" there is one acceptable string. Starting with position 716 corresponding to character "b" there are 21 acceptable strings. Finally, starting with position 718 corresponding to character "c" there are 21 acceptable strings.

Figure 8:
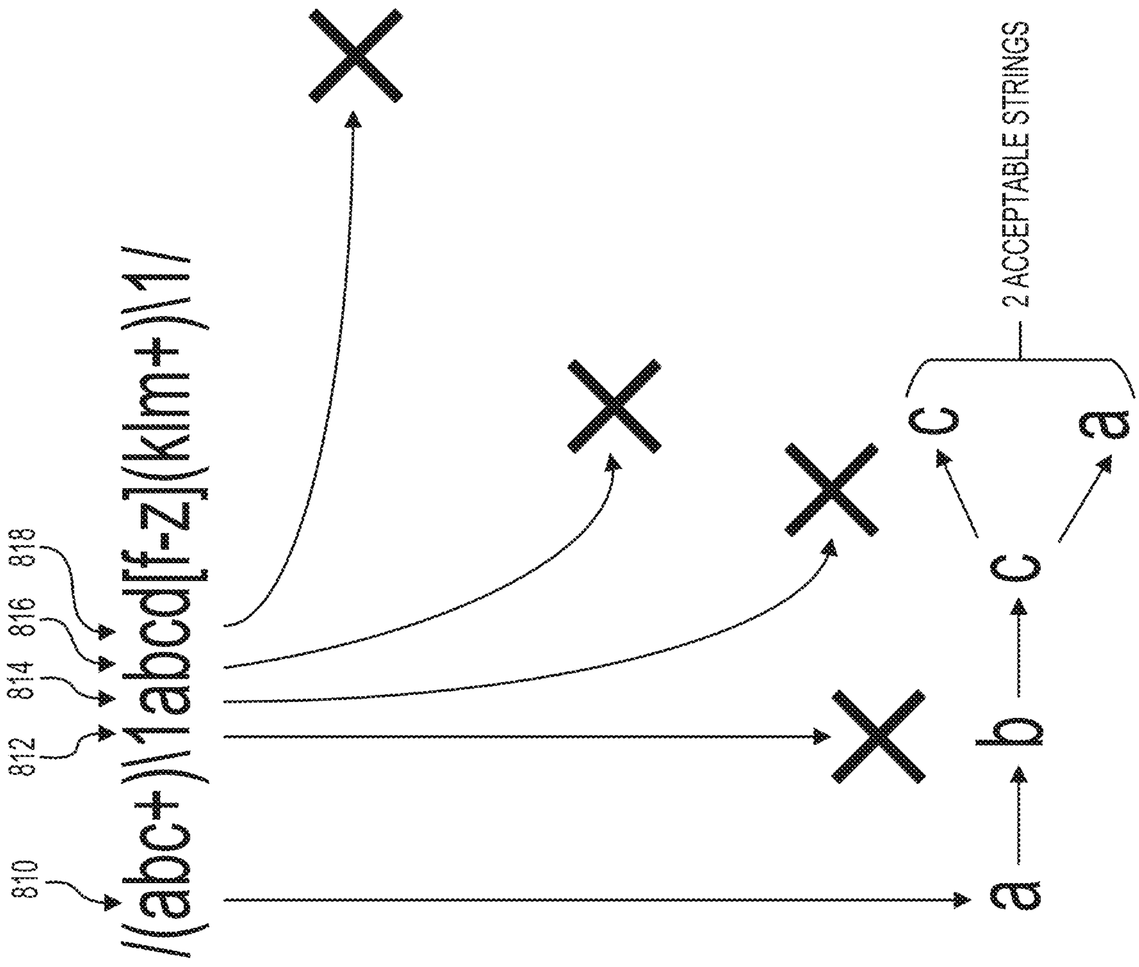
FIG. 8 shows another general split example.

FIG. 8 shows an example general split 800 for another regular expression pattern. General split 800 corresponds to the regular expression pattern: "/(abc+)\1abcd[f−z](klm+)\1/ ". Applying the process shown in Table 2 as part of the general split workflow stage 340 of FIG. 3 results in a DFA part "/abc(c|a)/" which corresponds to the Pre-Filter token described earlier with respect to FIG. 3. In addition, the NFA Left Forward token includes "/(abc+)\1abcd[f−z](klm+)\1/". Finally, the NFA Right Forward Token is empty in this example. In this example, the number of paths shown in FIG. 8 corresponds to the number of different acceptable strings for the regular expression: "/(abc+)\1abcd[f−z](klm+)\1/". Thus, in this example, starting with position 810 corresponding to the character "a", there are two acceptable strings. The position 812 corresponding to "1" is excluded as an unacceptable path because of the backreference, which cannot be processed without processing the string "abc+" preceding "\1". Positions 814, 816, and 818 are also excluded because of the "\1" after the string (klm+), which results in a cross-match scenario.

Figure 9:
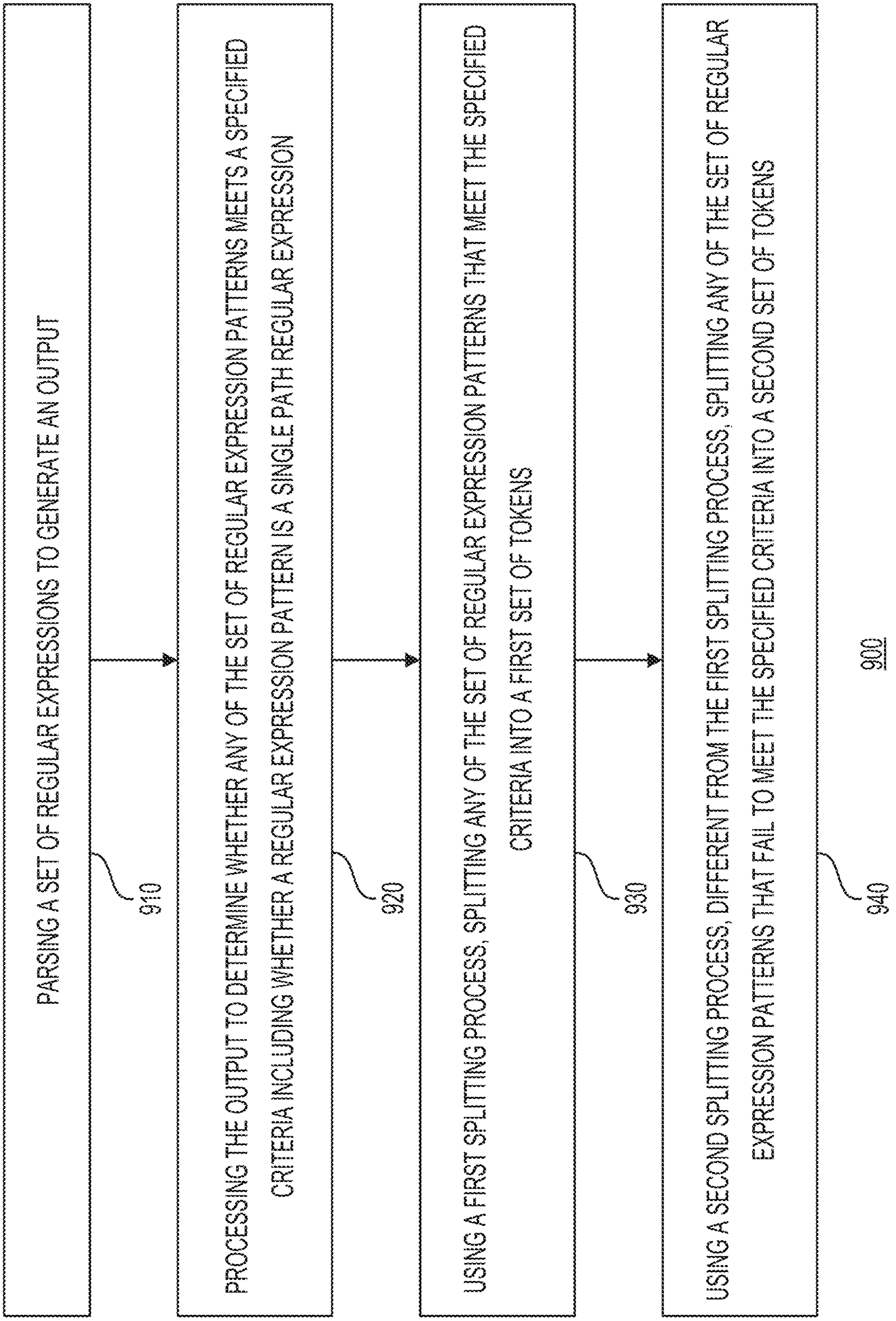
FIG. 9 is a flow chart of a method for splitting regular expressions between non-deterministic finite automaton and deterministic finite automaton in accordance with one example.

FIG. 9 is a flow chart 900 of a method for splitting regular expressions between non-deterministic finite automaton and deterministic finite automaton in accordance with one example. In this example, steps described as part of flow chart 900 are performed when instructions corresponding to regex compiler 224 are executed by processor 210 of FIG. 2. Step 910 includes parsing a set of regular expression patterns to generate an output. As explained earlier, tokenize block 110 of FIG. 1 (included in regex compiler 100) processes the received regular expressions and outputs an abstract syntax tree (AST), which is provided to split block 120 of FIG. 1.

Step 920 includes processing the output to determine whether any of the set of regular expression patterns meets a specified criteria including whether a regular expression pattern is a single path regular expression. As explained earlier with reference to FIG. 3, in this example, as part of the parse workflow stage 310, split block 120 of FIG. 1 separates the regular expressions into three tokens: Pre-Filter, Forward, and Reverse. The single path criterion is met as long as the path includes one or more arcs in a sequence and the path is not looping, is not returning back to previous state, and is not joining another path. As a result of the processing by the split block 120, the DFA part of the abstract syntax tree is provided to build NFA block 140 and the NFA part of the abstract syntax tree is provided to map NFA block 160.

Step 930 includes using a first splitting process, splitting any of the set of regular expression patterns that meet the specified criteria into a first set of tokens. In one example, this step is performed as part of the shortest unique prefix workflow stage 320 of FIG. 3. As described earlier, the splitting process includes the use of a prefix tree. As part of getting the prefix tree built, in this example, the prefix must satisfy the following criteria: (1) the prefix must be unique against the tree built so far, and (2) the minimal prefix length must be less than 2 (the minimal length could be tuned but it cannot be less than 2 because it is limited by the DFA capabilities). In cases where the remaining suffix length is less than 2 then the suffix is considered empty, and the prefix is viewed as being equal to the regular expression being processed. The prefix obtained via this criteria is the Pre-Filter token. The remainder of the regular expression pattern is sent for Forward NFA token processing, which starts from the right. The Backward NFA token is empty in such a case. FIGS. 4-6 provide split examples where the splitting is performed using the first splitting process mentioned as part of step 930.

Step 940 includes using a second splitting process, different from the first splitting process, splitting any of the set of regular expression patterns that fail to meet the specified criteria into a second set of tokens. In one example, this step is performed as part of the general split workflow stage 340 of the split workflow 300 of FIG. 3. As noted earlier, the purpose of the general split is to find a token on the top level of a regular expression, starting from which the set of acceptable strings is minimal. The general split algorithm has two parameters: the minimal prefix length and the maximal prefix length. Table 2, described previously in the context of FIG. 3, shows the processing performed as part of the general split workflow stage 340 of FIG. 3. FIGS. 7 and 8 provide split examples where the splitting is performed using the second splitting process mentioned as part of step 940. Although FIG. 9 describes several steps performed in a certain order, additional or fewer steps may be performed in a different order.

Figure 10:
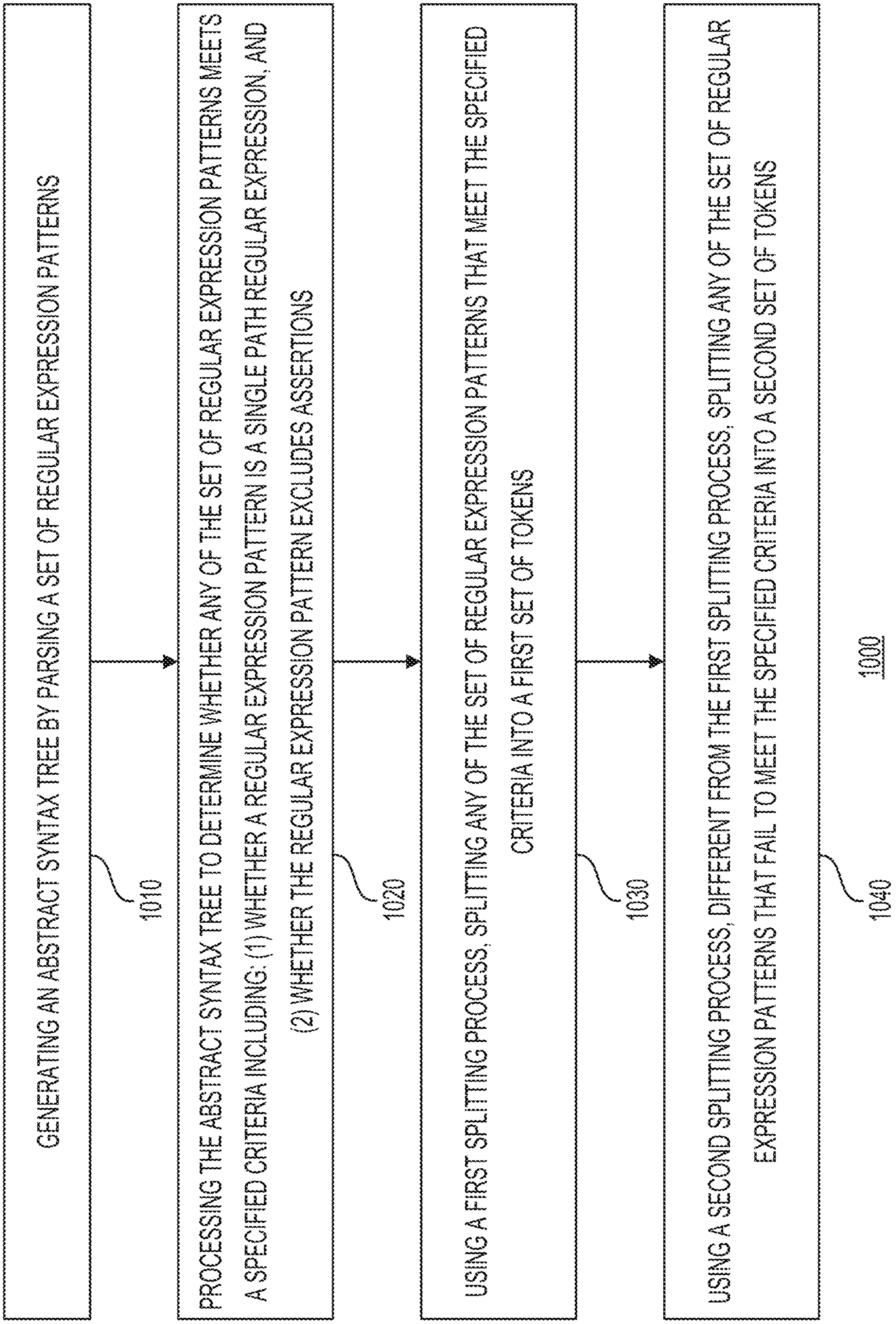
FIG. 10 is a flow chart of another method for splitting regular expressions between non-deterministic finite automaton and deterministic finite automaton in accordance with one example.

FIG. 10 is a flow chart 1000 of another method for splitting regular expressions between non-deterministic finite automaton and deterministic finite automaton in accordance with one example. In this example, steps described as part of flow chart 1000 are performed when instructions corresponding to regex compiler 224 are executed by processor 210 of FIG. 2. Step 1010 includes generating an abstract syntax tree by parsing a set of regular expression patterns. As explained earlier, tokenize block 110 of FIG. 1 (included in regex compiler 100) processes the received regular expressions and outputs an abstract syntax tree (AST), which is provided to split block 120 of FIG. 1.

Step 1020 includes processing the abstract syntax tree to determine whether any of the set of regular expression patterns meets a specified criteria including: (1) whether a regular expression pattern is a single path regular expression, and (2) whether the regular expression pattern excludes assertions. As explained earlier with reference to FIG. 3, in this example, as part of the parse workflow stage 310, split block 120 of FIG. 1 separates the regular expressions into three tokens: Pre-Filter, Forward, and Reverse. The single path criterion is met as long as the path includes one or more arcs in a sequence and the path is not looping, is not returning back to previous state, and is not joining another path. As explained earlier, an assertion can be a special constraint (e.g., the beginning of a word or the beginning of a line). As a result of the processing by the split block 120, the DFA part of the abstract syntax tree is provided to build NFA block 140 and the NFA part of the abstract syntax tree is provided to map NFA block 160.

Step 1030 includes using a first splitting process, splitting any of the set of regular expression patterns that meet the specified criteria into a first set of tokens. In one example, this step is performed as part of the shortest unique prefix workflow stage 320 of FIG. 3. As described earlier, the splitting process includes the use of a prefix tree. As part of getting the prefix tree built, in this example, the prefix must satisfy the following criteria: (1) the prefix must be unique against the tree built so far, and (2) the minimal prefix length must be less than 2 (the minimal length could be tuned but it cannot be less than 2 because it is limited by the DFA capabilities). In cases where the remaining suffix length is less than 2 then the suffix is considered empty, and the prefix is viewed as being equal to the regular expression being processed. The prefix obtained via this criteria is the Pre-Filter token. The remainder of the regular expression pattern is sent for Forward NFA token processing, which starts from the right. The Backward NFA token is empty in such a case. FIGS. 4-6 provide split examples where the splitting is performed using the first splitting process mentioned as part of step 1030.

Step 1040 includes using a second splitting process, different from the first splitting process, splitting any of the set of regular expression patterns that fail to meet the specified criteria into a second set of tokens. In one example, this step is performed as part of the general split workflow stage 340 of the split workflow 300 of FIG. 3. As noted earlier, the purpose of the general split is to find a token on the top level of a regular expression, starting from which the set of acceptable strings is minimal. The general split algorithm has two parameters: the minimal prefix length and the maximal prefix length. Table 2, described previously in the context of FIG. 3, shows the processing performed as part of the general split workflow stage 340 of FIG. 3. FIGS. 7 and 8 provide split examples where the splitting is performed using the second splitting process mentioned as part of step 1040. Although FIG. 10 describes several steps performed in a certain order, additional or fewer steps may be performed in a different order.

In conclusion, the present disclosure relates to a computer-implemented method including parsing a set of regular expression patterns to generate an output. The method further includes processing the output to determine whether any of the set of regular expression patterns meets a specified criteria, including whether a regular expression pattern is a single path regular expression.

The method further includes using a first splitting process, splitting any of the set of regular expression patterns that meet the specified criteria into a first set of tokens. The method further includes using a second splitting process, different from the first splitting process, splitting any of the set of regular expression patterns that fail to meet the specified criteria into a second set of tokens.

The first splitting process may comprise finding each of any prefixes that corresponds to a shortest unique prefix for any of the set of regular expression patterns that meet the specified criteria. The shortest unique prefix comprises a minimal prefix length that is unique against a prefix tree for any of the set of regular expression patterns that meet the specified criteria. Any prefixes found to be corresponding to the shortest unique prefix are compiled for processing by a deterministic finite automaton. Any remaining suffixes for the set of patterns, excluding any prefixes found to be corresponding to the shortest unique prefix, are compiled for processing by a non-deterministic finite automaton.

The second splitting process may comprise: (1) starting from each top level token of a regular expression calculating a size of a set of acceptable strings limited by a value of a specified minimal prefix length, (2) while keeping the size of the set of acceptable strings limited, increasing lengths of each of the acceptable strings, and (3) from among resulting sets of acceptable strings, selecting a first one of the acceptable strings that has a specified maximal length. The first splitting process may output a first deterministic finite automaton (DFA) part of an abstract syntax tree (AST) and a non-deterministic finite automaton (NFA) part of the AST, and the second splitting process may output a second DFA part of the AST and a second NFA part of the AST.

In another example, the present disclosure relates to a computer-implemented method including generating an abstract syntax tree by parsing a set of regular expression patterns. The method further includes processing the abstract syntax tree to determine whether any of the set of regular expression patterns meets a specified criteria including: (1) whether a regular expression pattern is a single path regular expression, and (2) whether the regular expression pattern excludes assertions.

The method further includes using a first splitting process, splitting any of the set of regular expression patterns that meet the specified criteria into a first set of tokens. The method further includes using a second splitting process, different from the first splitting process, splitting any of the set of regular expression patterns that fail to meet the specified criteria into a second set of tokens.

The first splitting process may comprise finding each of any prefixes that corresponds to a shortest unique prefix for any of the set of regular expression patterns that meet the specified criteria. The shortest unique prefix comprises a minimal prefix length that is unique against a prefix tree for any of the set of regular expression patterns that meet the specified criteria. Any prefixes found to be corresponding to the shortest unique prefix may be compiled for processing by a deterministic finite automaton. Any remaining suffixes for the set of patterns, excluding any prefixes found to be corresponding to the shortest unique prefix, may be compiled for processing by a non-deterministic finite automaton.

The second splitting process may comprise: (1) starting from each top level token of a regular expression calculating a size of a set of acceptable strings limited by a value of a specified minimal prefix length, and (2) while keeping the size of the set of acceptable strings limited, increasing lengths of each of the acceptable strings, and (3) from among resulting sets of acceptable strings, selecting a first one that of the acceptable strings that has a specified maximal length. The first splitting process may output a first deterministic finite automaton (DFA) part of an abstract syntax tree (AST) and a non-deterministic finite automaton (NFA) part of the AST, and the second splitting process may output a second DFA part of the AST and a second NFA part of the AST.

In yet another example, the present disclosure relates to a non-transitory computer-readable medium comprising code corresponding to a method. The method includes parsing a set of regular expression patterns to generate an output. The method further includes processing the output to determine whether any of the set of regular expression patterns meets a specified criteria, including whether a regular expression pattern is a single path regular expression.

The method further includes using a first splitting process, splitting any of the set of regular expression patterns that meet the specified criteria into a first set of tokens. The method further includes using a second splitting process, different from the first splitting process, splitting any of the set of regular expression patterns that fail to meet the specified criteria into a second set of tokens.

Any prefixes found to be corresponding to the shortest unique prefix may be compiled for processing by a deterministic finite automaton. Any remaining suffixes for the set of patterns, excluding any prefixes found to be corresponding to the shortest unique prefix, may be compiled for processing by a non-deterministic finite automaton. The first splitting process may output a first deterministic finite automaton (DFA) part of an abstract syntax tree (AST) and a non-deterministic finite automaton (NFA) part of the AST, and the second splitting process may output a second DFA part of the AST and a second NFA part of the AST.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), or Complex Programmable Logic Devices (CPLDs). In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A computer-implemented method comprising:

parsing a set of regular expression patterns to generate an output;

processing the output to determine whether any of the set of regular expression patterns meets a specified criteria including whether a regular expression pattern is a single path regular expression;

using a first splitting process, splitting any of the set of regular expression patterns that meet the specified criteria into a first set of tokens; and using a second splitting process, different from the first splitting process, splitting any of the set of regular expression patterns that fail to meet the specified criteria into a second set of tokens, wherein the first splitting process outputs a first deterministic finite automaton (DFA) part of an abstract syntax tree (AST) and a first non-deterministic finite automaton (NFA) part of the AST, and wherein the second splitting process outputs a second DFA part of the AST and a second NFA part of the AST.

2. The method of claim 1, wherein the first splitting process comprises finding each of any prefixes that corresponds to a shortest unique prefix for any of the set of regular expression patterns that meet the specified criteria.

3. The method of claim 2, wherein the shortest unique prefix comprises a minimal prefix length that is unique against a prefix tree for any of the set of regular expression patterns that meet the specified criteria.

4. The method of claim 3, wherein any prefixes found to be corresponding to the shortest unique prefix are compiled for processing by a deterministic finite automaton.

5. The method of claim 4, wherein any remaining suffixes for the set of patterns, excluding any prefixes found to be corresponding to the shortest unique prefix, are compiled for processing by a non-deterministic finite automaton.

6. The method of claim 1, wherein the second splitting process comprises: (1) starting from each top level token of a regular expression calculating a size of a set of acceptable strings limited by a value of a specified minimal prefix length, (2) while keeping the size of the set of acceptable strings limited, increasing lengths of each of the acceptable strings, and (3) from among resulting sets of acceptable strings, selecting a first one of the acceptable strings that has a specified maximal length.

7. The method of claim 1, further comprising processing each of the first DFA part of the AST, the second DFA part of the AST, the first NFA part of the AST, and the second NFA part of the AST to generate output binary for storage.

8. A computer-implemented method comprising:

generating an abstract syntax tree by parsing a set of regular expression patterns;

processing the abstract syntax tree to determine whether any of the set of regular expression patterns meets a specified criteria including: (1) whether a regular expression pattern is a single path regular expression, and (2) whether the regular expression pattern excludes assertions;

using a first splitting process, splitting any of the set of regular expression patterns that meet the specified criteria into a first set of tokens; and using a second splitting process, different from the first splitting process, splitting any of the set of regular expression patterns that fail to meet the specified criteria into a second set of tokens, wherein the first splitting process outputs a first deterministic finite automaton (DFA) part of an abstract syntax tree (AST) and a first non-deterministic finite automaton (NFA) part of the AST, and wherein the second splitting process outputs a second DFA part of the AST and a second NFA part of the AST.

9. The method of claim 8, wherein the first splitting process comprises finding each of any prefixes that corresponds to a shortest unique prefix for any of the set of regular expression patterns that meet the specified criteria.

10. The method of claim 9, wherein the shortest unique prefix comprises a minimal prefix length that is unique against a prefix tree for any of the set of regular expression patterns that meet the specified criteria.

11. The method of claim 10, wherein any prefixes found to be corresponding to the shortest unique prefix are compiled for processing by a deterministic finite automaton.

12. The method of claim 11, wherein any remaining suffixes for the set of patterns, excluding any prefixes found to be corresponding to the shortest unique prefix, are compiled for processing by a non-deterministic finite automaton.

13. The method of claim 8, wherein the second splitting process comprises: (1) starting from each top level token of a regular expression calculating a size of a set of acceptable strings limited by a value of a specified minimal prefix length, and (2) while keeping the size of the set of acceptable strings limited, increasing lengths of each of the acceptable strings, and (3) from among resulting sets of acceptable strings, selecting a first one that of the acceptable strings that has a specified maximal length.

14. The method of claim 8, further comprising processing each of the first DFA part of the AST, the second DFA part of the AST, the first NFA part of the AST, and the second NFA part of the AST to generate output binary for storage.

15. A non-transitory computer-readable medium comprising code corresponding to a method, the method comprising:

parsing a set of regular expression patterns to generate an output;

processing the output to determine whether any of the set of regular expression patterns meets a specified criteria including whether a regular expression pattern is a single path regular expression;

using a first splitting process, splitting any of the set of regular expression patterns that meet the specified criteria into a first set of tokens; and using a second splitting process, different from the first splitting process, splitting any of the set of regular expression patterns that fail to meet the specified criteria into a second set of tokens, wherein the first splitting process outputs a first deterministic finite automaton (DFA) part of an abstract syntax tree (AST) and a first non-deterministic finite automaton (NFA) part of the AST, and wherein the second splitting process outputs a second DFA part of the AST and a second NFA part of the AST.

16. The non-transitory computer-readable medium of claim 15, wherein the first splitting process comprises finding each of any prefixes that corresponds to a shortest unique prefix for any of the set of regular expression patterns that meet the specified criteria.

17. The non-transitory computer-readable medium of claim 16, wherein the shortest unique prefix comprises a minimal prefix length that is unique against a prefix tree for any of the set of regular expression patterns that meet the specified criteria.

18. The non-transitory computer-readable medium of claim 17, wherein any prefixes found to be corresponding to the shortest unique prefix are compiled for processing by a deterministic finite automaton.

19. The non-transitory computer-readable medium of claim 18, wherein any remaining suffixes for the set of patterns, excluding any prefixes found to be corresponding to the shortest unique prefix, are compiled for processing by a non-deterministic finite automaton.

20. The non-transitory computer-readable medium of claim 15, where the method further comprises processing each of the first DFA part of the AST, the second DFA part of the AST, the first NFA part of the AST, and the second NFA part of the AST to generate output binary for storage.

* * * * *